United States Patent
Renkis

(10) Patent No.: US 12,229,616 B1
(45) Date of Patent: Feb. 18, 2025

(54) ASSET MANAGEMENT WITH TAGS USING MEDIA INTELLIGENCE

(71) Applicant: Tagii, Inc., Nashville, TN (US)

(72) Inventor: Martin A. Renkis, Nashville, TN (US)

(73) Assignee: Tagii, Inc., Nashville, TN (US)

( * ) Notice: Subject to any disclaimer, the term of this patent is extended or adjusted under 35 U.S.C. 154(b) by 0 days.

(21) Appl. No.: 18/215,341

(22) Filed: Jun. 28, 2023

Related U.S. Application Data

(60) Provisional application No. 63/356,761, filed on Jun. 29, 2022.

(51) Int. Cl.
| | | |
|---|---|---|
| *G06K 19/077* | (2006.01) | |
| *G06F 16/783* | (2019.01) | |
| *G06K 19/06* | (2006.01) | |
| *G06Q 20/12* | (2012.01) | |

(52) U.S. Cl.
CPC ..... *G06K 19/07758* (2013.01); *G06F 16/785* (2019.01); *G06F 16/7854* (2019.01); *G06K 19/06037* (2013.01); *G06Q 20/123* (2013.01)

(58) Field of Classification Search
CPC .............................. G06Q 10/08; G06Q 20/203
See application file for complete search history.

(56) References Cited

U.S. PATENT DOCUMENTS

| | | |
|---|---|---|
| 9,235,600 B2 | 1/2016 | Boncyk et al. |
| 9,536,148 B2 | 1/2017 | Gross |
| 9,744,671 B2 | 8/2017 | Connell et al. |
| 9,892,744 B1 | 2/2018 | Salonidis et al. |
| 11,205,100 B2 | 12/2021 | Desai et al. |
| 2012/0033850 A1 | 2/2012 | Owens et al. |
| 2017/0270473 A1* | 9/2017 | La Gloria .......... G06K 7/10861 |
| 2021/0142097 A1 | 5/2021 | Zheng et al. |
| 2021/0271957 A1 | 9/2021 | Lee et al. |

FOREIGN PATENT DOCUMENTS

WO   WO-2021007621 A1 *   1/2021   ............. G06Q 10/10

* cited by examiner

*Primary Examiner* — Sonji N Johnson
*Assistant Examiner* — April A Taylor
(74) *Attorney, Agent, or Firm* — NEO IP

(57) ABSTRACT

Systems, apparatuses, and methods for asset tagging and management. Users connect any asset to the platform by scanning a tag affixed to the asset. Tagged assets are registered to a user's account. The platform deploys Artificial Intelligence (AI), Machine Learning (ML), and Deep Learning (DL) in order to promote efficient and effective management of a user's tagged assets, in addition to providing organizational, repair, and maintenance services for any tagged assets. The system incorporates image data, video data, and/or audio data to manage the tagged assets.

18 Claims, 9 Drawing Sheets

ASSET MANAGEMENT WITH TAGS USING MEDIA INTELLIGENCE

CROSS REFERENCES TO RELATED APPLICATIONS

This application is related to and claims priority from the following U.S. patent application. This application claims priority to and the benefit of U.S. Application No. 63/356,761, filed Jun. 29, 2022, which is incorporated herein by reference in its entirety.

BACKGROUND OF THE INVENTION

1. Field of the Invention

The present invention relates to an asset management and artificial intelligence system for non-network enabled assets, and more specifically to tagging, connecting, and analyzing media regarding the assets of a user.

2. Description of the Prior Art

It is generally known in the prior art to provide analysis of image and video media to determine properties of physical assets. Similarly, it is generally known in the prior art to analyze the speech of a user to provide a user with desirable information regarding the states of certain assets.

Prior art patent documents include the following:

US Patent Pub. No. 2021/0271957 for Anomaly detection using machine-learning based normal signal removing filter by inventors Lee, et al., filed Feb. 11, 2021, and published Sep. 2, 2021, is directed to technology for detecting an abnormal signal using a filter for removing normal sound (or normal signals) around a sensor at normal times. The filter removes normal sound based on a denoising autoencoder learning technique for removing noise and is used to determine whether field sound is an abnormal signal different from that of normal times. The filter is trained to pass normal sound, regarded as noise, to output a value of 0 and pass an abnormal signal without change. The filter is retrained by collecting only normal sound rather than abnormal signals in the field and then adding the collected normal sound to the existing training data. This allows machine-learning nonexperts to easily and conveniently retrain the filter.

US Patent Pub. No. 2012/0033850 for Methods and systems for optical asset recognition and location tracking by inventors Owens, et al., filed Aug. 5, 2010, and published Feb. 9, 2012, is directed to managing assets associated with a platform. This includes receiving an optical image of an asset associated with the platform, comparing, using an optical recognition program, the optical image of the asset to images of assets within a library of asset images to identify the asset, assigning a location for the identified asset, and updating a database, including one or more of an asset inventory and a platform configuration, based on the identification and location of the asset.

US Patent Pub. No. 2021/0142097 for Image processing system by inventors Zheng, et al., filed Jun. 15, 2018, and published May 13, 2021, is directed to an image processing system that identifies objects within images or video segments. To identify an object within an image, the system identifies one or more regions of an image that contain an object. A tracklet is used to track an object through a plurality of image frames within a video segment allowing more than one image frame to be used in object detection, to increase detection accuracy. The system utilizes a deep learning-based object detection framework and a similar object search framework that models the correlations present between various object categories. The system determines a category for each object detected using a hierarchical tree of categories to learn the visual similarities between various object categories. The hierarchical tree is estimated by analyzing the errors of an object detector which does not use any correlation between the object categories.

U.S. Pat. No. 11,205,100 for Edge-based adaptive machine learning for object recognition by inventors Desai, et al., filed Nov. 2, 2017, and issued Dec. 21, 2021, is directed to techniques for adaptive model training. The computer-implemented method for adaptive model training includes generating, by a processing system, a training instance based at least in part on a plurality of images that match a contextual specification of a target visual domain. The method further includes extracting, by the processing system, objects from one of the plurality of images. The method further includes for each extracted object, generating, by the processing system, a plurality of machine learning model features and label recommendations for a user.

U.S. Pat. No. 9,892,744 for Acoustics based anomaly detection in machine rooms by inventors Salonidis, et al., filed Feb. 13, 2017, and issued Feb. 13, 2018, is directed to monitoring a plurality of machines located in an operating environment. First and second acoustic signal readings and their respective detecting locations are received from a sensing device. First and second acoustic signal spatialization maps containing characteristic data signatures for the machines are generated based on the first and second acoustic signal readings. Differences are determined that exceed a predetermined threshold value, between corresponding characteristic data signatures in each of the first and second acoustic signal spatialization maps. Machines that are associated with the determined differences are identified. A corrective action to perform on the machine is identified, based on the determined differences. Commands are transmitted to a corrective action module in the operating environment to cause the corrective action module to perform the corrective action.

U.S. Pat. No. 9,744,671 for Information technology asset type identification using a mobile vision-enabled robot by inventors Connell, et al., filed Mar. 18, 2016, and issued Aug. 29, 2017, is directed to mechanisms for classifying an obstacle as an asset type. The mechanisms receive a digital image of an obstacle from an image capture device of an automated robot. The mechanisms perform a classification operation on the digital image of the obstacle to identify a proposed asset type classification for the obstacle. The mechanisms determine a final asset type for the obstacle based on the proposed asset type classification for the obstacle. The mechanisms update a map data structure for a physical premises in which the obstacle is present based on the final asset type.

U.S. Pat. No. 9,536,148 for Property assessment and prospecting tool by inventor Gross, filed Sep. 26, 2014, and issued Jan. 3, 2017, is directed to a property assessment system including image processing logic configured to identify building structure attributes from image data and rate their associated condition. The outputs can include property condition ratings, occupancy predictions, and similar scores.

U.S. Pat. No. 9,235,600 for Image capture and identification system and process by inventors Boncyk, et al., filed Aug. 19, 2014, and issued Jan. 12, 2016, is directed to capturing a digital image of an object and recognizing the object from a plurality of objects in a database. An information address corresponding to the object is then used to access information and initiate communication pertinent to the object.

SUMMARY OF THE INVENTION

The present invention relates to systems, apparatuses, and methods for management of non-network enabled assets, and more specifically to tagging, connecting, and analyzing media of the assets of a user.

It is an object of this invention to provide management of non-network enabled assets using machine learning and artificial intelligence, and analyzing media of the non-network enabled assets.

In one embodiment, the present invention provides a system for asset management comprising at least one tag attached to at least one asset, an asset management platform including a server with a processor and a memory, wherein the asset management platform includes a database, wherein the at least one tag is associated with asset data related to the at least one asset, wherein the database includes at least one media file associated with the at least one asset, wherein the at least one media file includes at least one image file of the at least one asset, at least one video file of the at least one asset, and/or at least one audio file associated with the at least one asset, and wherein the asset data and the at least one media file is configured to be displayed on a display of a remote device or played by the remote device upon the remote device reading the at least one tag.

In another embodiment, the present invention provides a system for asset management comprising at least one tag attached to at least one asset, an asset management platform including a server with a processor and a memory, wherein the asset management platform includes a media processing engine, wherein the at least one tag is associated with asset data related to the at least one asset, wherein the asset management platform is configured to receive at least one media file associated with the at least one asset, wherein the media processing engine is configured to analyze image, video, and/or audio components of the at least one media file, and wherein the media processing engine is configured to recommend an action based on the analysis of the image, video, and/or audio components of the at least one media file.

In yet another embodiment, the present invention provides a system for asset management comprising at least one tag attached to at least one asset, an asset management platform including a server with a processor and a memory, wherein the asset management platform includes a database and an audio processing engine, wherein the at least one tag is associated with asset data related to the at least one asset, wherein the database includes data associated with the at least one asset, wherein upon the remote device reading the at least one tag, the remote device is operable to access the information in the database associated with the at least one asset, wherein after reading the at least one tag and accessing the information in the database associated with the at least one asset, the audio processing engine is configured to receive audio from the remote device, wherein the audio includes a request for information for the at least one asset, wherein the audio processing engine is configured to analyze request for information and generate a response to the request for information for the at least one asset based on the information in the database associated with the at least one asset, and wherein the asset management platform is configured to send the response to the request for information to the remote device and the remote device is configured to display the response or play the response via a speaker.

These and other aspects of the present invention will become apparent to those skilled in the art after a reading of the following description of the preferred embodiment when considered with the drawings, as they support the claimed invention.

DETAILED DESCRIPTION

Figure 1:
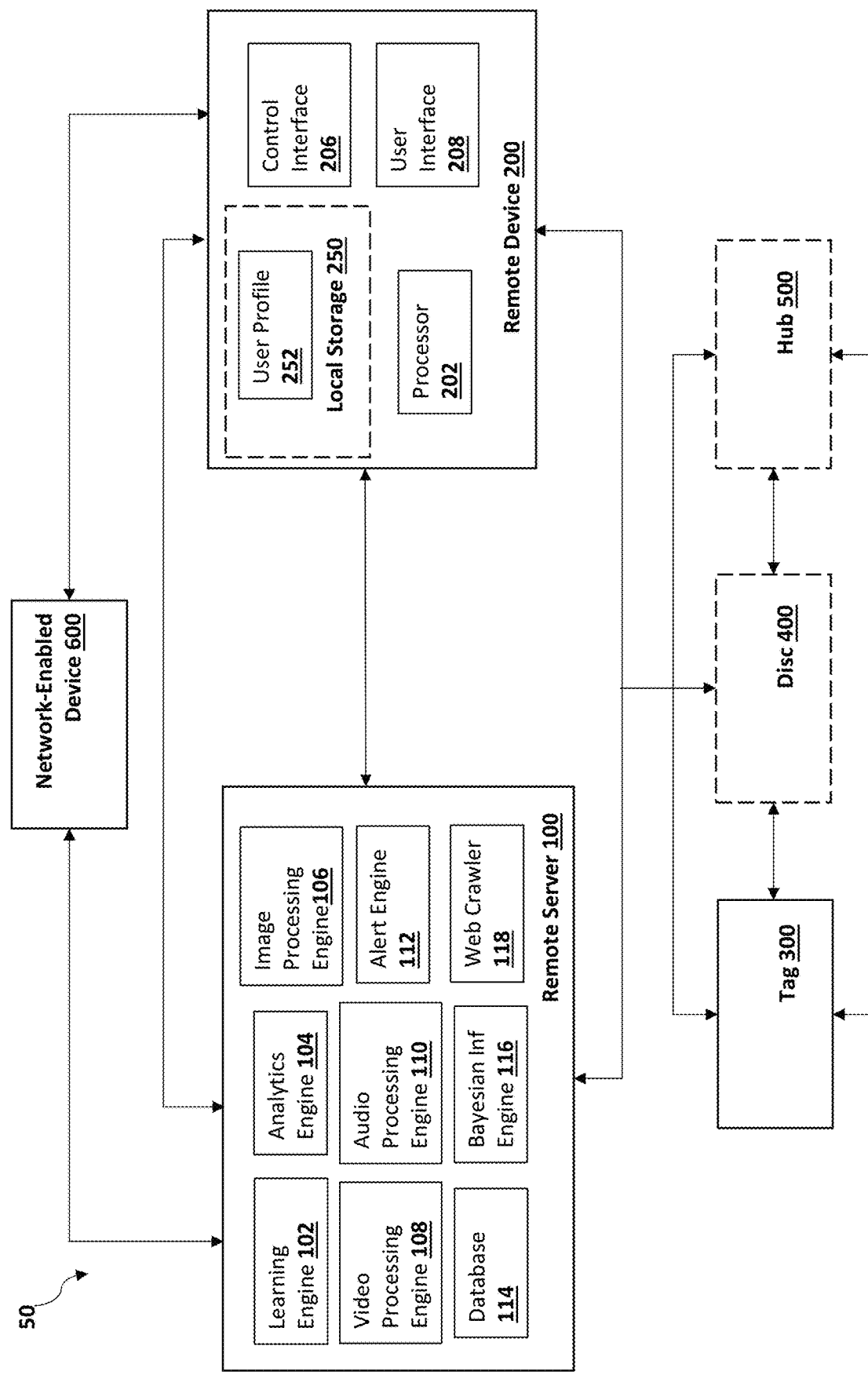
FIG. 1 illustrates a block diagram of an intelligent asset management system.

The present invention is generally directed to systems and methods for tagging, connecting, managing, locating, generating artificial intelligence from, and monitoring assets that traditionally are not connected to other devices and are not operable to be connected to a network.

In one embodiment, the present invention provides a system for asset management comprising at least one tag attached to at least one asset, an asset management platform including a server with a processor and a memory, wherein the asset management platform includes a database, wherein the at least one tag is associated with asset data related to the at least one asset, wherein the database includes at least one media file associated with the at least one asset, wherein the at least one media file includes at least one image file of the at least one asset, at least one video file of the at least one asset, and/or at least one audio file associated with the at least one asset, and wherein the asset data and the at least one media file is configured to be displayed on a display of a remote device or played by the remote device upon the remote device reading the at least one tag.

In another embodiment, the present invention provides a system for asset management comprising at least one tag attached to at least one asset, an asset management platform including a server with a processor and a memory, wherein the asset management platform includes a media processing engine, wherein the at least one tag is associated with asset data related to the at least one asset, wherein the asset management platform is configured to receive at least one media file associated with the at least one asset, wherein the media processing engine is configured to analyze image, video, and/or audio components of the at least one media file, and wherein the media processing engine is configured to recommend an action based on the analysis of the image, video, and/or audio components of the at least one media file.

In yet another embodiment, the present invention provides a system for asset management comprising at least one tag attached to at least one asset, an asset management platform including a server with a processor and a memory, wherein the asset management platform includes a database and an audio processing engine, wherein the at least one tag is associated with asset data related to the at least one asset, wherein the database includes data associated with the at least one asset, wherein upon the remote device reading the at least one tag, the remote device is operable to access the information in the database associated with the at least one asset, wherein after reading the at least one tag and accessing the information in the database associated with the at least one asset, the audio processing engine is configured to receive audio from the remote device, wherein the audio includes a request for information for the at least one asset, wherein the audio processing engine is configured to analyze request for information and generate a response to the request for information for the at least one asset based on the information in the database associated with the at least one asset, and wherein the asset management platform is configured to send the response to the request for information to the remote device and the remote device is configured to display the response or play the response via a speaker.

Businesses and individuals own and are responsible for a growing number of physical assets of all sizes, shapes, and types. Because most of these things are not connected to a network, it is difficult to organize, locate, monitor, secure, authenticate, share, manage, and/or generate intelligence from them. These "unconnected assets" (or "dumb" assets) which lack any networking functionality or capabilities include, but are not limited to, manufacturing inventories, office equipment, medical equipment, mobile equipment, tools, supplies, artwork, and furniture, among an almost unlimited list of unconnected physical things. Despite the growing number of connected things, most all things in the world are still not connected, thus creating a need for solutions to organize, locate, monitor, secure, authenticate, share, manage, and/or generate intelligence from unconnected things.

Having the ability to tag and connect these unconnected assets in a secure and immutable way makes them smart and creates the ability to better organize, locate, monitor, secure, authenticate, share, manage, and/or generate intelligence from them. Moreover, the present invention provides a platform for users to collect data about an asset and its environment as well as assign data to the asset to create valuable and actionable intelligence as well as automation and workflows.

The present invention utilizes an intelligent asset management platform for associating media (e.g., audio, video, images) with at least one tagged asset and providing intelligence based on the media associated with the at least one tagged asset or any group of tagged assets. The platform is operable to allow users to register any tagged asset to the user's account, including, but not limited to, dumb assets and/or non-network enabled assets (e.g., furniture, medical equipment, manufacturing inventory, etc.). In one embodiment, the platform also includes a smart tag that connects to a remote device, a disc, a hub, and/or directly to the Internet. The remote device, the smart tag, the disc, and/or the hub is operable to transmit data to the platform in real-time or near real-time including, but not limited to, data related to location, velocity, speed, altitude, temperature, humidity, weight, size, dimensions, mass, density, a sound, an image, and/or a video of any asset. Once tagged assets are registered with the platform, Machine Learning (ML), Deep Learning (DL), and/or Artificial Intelligence (AI) are deployed to assist in providing intelligence regarding the tagged assets, such as product support and upgrades for tagged assets, repair and maintenance notifications for tagged assets, user engagement with the platform, and/or market research specific to the tagged assets. Media is operable to be associated with a tagged asset after the tagged asset is registered to the platform. The system is also operable to manage measurements and/or data related to any tagged asset and provide detailed reporting, alerts, and initiate actions based on the measurements and/or data.

None of the prior art discloses association of data collected through image, video, and audio analytics with a tag associated with a physical asset, allowing for the data to be quickly and easily accessed by the owner of the asset. Similarly, none of the prior art discloses the use of Artificial Intelligence (AI), Machine Learning (ML), and/or Deep Learning (DL) in conjunction with an intelligent asset management platform for tagging, monitoring, and managing a user's inventory, including "dumb" assets and/or non-network enabled assets, wherein the platform is operable to initiate actions based on measurements obtained regarding the state of the assets within the user's inventory. Advantageously, the present invention allows for patterns related to the asset to be learned, allowing for the patterns related to the asset to be used to initiate actions (e.g., in network connected devices) and/or to be reported to the user. For example, the platform is operable to provide users with recommendations related to the tagged assets. Therefore, the present invention provides a level of management and convenience not provided by assets lacking network connectivity.

Referring now to the drawings in general, the illustrations are for the purpose of describing one or more preferred embodiments of the invention and are not intended to limit the invention thereto.

FIG. 1 is a block diagram of one embodiment of the intelligent asset management system 50. The intelligent asset management system 50 includes at least one remote server 100 and at least one remote device 200 in network communication with each other and with at least one tag 300, at least one disc 400, and/or at least one hub 500. The intelligent asset management system 50 is configured to collect, process, analyze, model, and present data related to the at least one tag 300 associated with at least one asset. The intelligent asset management system 50 is configured to determine real-time or near-real-time conditions of the at least one tag 300 associated with at least one asset. The intelligent asset management system 50 is further operable to initiate at least one action in response to conditions related to the at least one tag 300 and/or the at least one asset. In one embodiment, the intelligent asset management system 50 further includes at least one network-enabled device 600. The at least one network-enabled device 600 is in network communication with the at least one remote server 100 and/or the at least one remote device 200. In a preferred embodiment, the at least one network-enabled device 600 is operable to receive commands from the at least one remote server 100 and/or the at least one remote device 200. For example, and not limitation, the at least one network-enabled device is a smart refrigerator and is operable to receive commands related to temperature from the at least one remote server and/or the at least one remote device.

The at least one remote server 100 includes a plurality of engines, at least one processor, and at least one memory. The plurality of engines includes, but is not limited to, an intelligence engine 102, an analytics engine 104, a client management engine 106, a locations engine 108, a learning engine 110, an alert engine 112, a calibration engine 114, and/or a Bayesian inference engine 116. Preferably, each engine is operable to receive data from at least one other engine of the plurality of engines. For example, and not limitation, the analytics engine is configured to receive data from all of the other engines of the plurality of engines to provide an analysis of every aspect of the assets. In one embodiment, the at least one remote server 100 is a cloud-based server. The at least one remote server 100 preferably includes at least one database 110. The at least one database 110 is operable to store information including, but not limited to, information related to at least one user, at least one tag, at least one tagged asset, location data, and/or environmental data. For example, and not limitation, the information is operable to include weather, temperature in a building, police reports, video from a TV news source (e.g., public TV news source), audio from news radio or police radio, pictures or video posted on social media, a number of users on a social media account, social media data, and/or Metaverse data. In one embodiment, the at least one remote server includes a web crawler 118.

In one embodiment, the system is operable to leverage a Bayesian inference engine 116. Unlike in a normal decision tree or a flow process, every node (tag) connected to this network is operable to infer its state to all other nodes (tags) connected to the network, so every tag knows about every other tag. Unlike any other intelligence system, this embodiment enables information flow in all directions at all times. This is unlike a left to right logic or branching logic. For example, and not limitation, if the weight of the asset of a first tag is less than 45 kg (99.2 lbs.) and the temperature of the environment of the asset of a second tag is greater than 32° C. (89.6° F.) and it is not raining outside, then open the spigot and water the plants located near the asset of the second tag. Another example is if in the next 48 hours less than 100 tags are scanned in at physical location warehouse A and during the same period if there are less than 50 tags in physical location warehouse B and less than 10 tags in physical location warehouse C, then represent this as an alarm event and/or send an alert (e.g., an email, text message) to the shipping manager.

The at least one remote device 200 includes, but is not limited to, a smartphone, a tablet, a laptop computer, and/or a desktop computer. The at least one remote device 200 includes at least one processor 202, a control interface 206, a user interface 208 (e.g., a graphical user interface (GUI)), and local storage 250 (e.g., at least one memory). The at least one remote device 200 is operable to receive data from the at least one remote server 100 and to transmit data to the at least one remote server 100. In a preferred embodiment, the at least one remote device 200 further includes a camera and/or a microphone and is operable to collect and transmit image data, video data, and/or audio data to the at least one remote server 100. In one embodiment, the at least one remote device 200 is further operable to receive data from the at least one tag 300, the at least one disc 400, and/or the at least one hub 500. The at least one remote device 200 is operable to store data in the local storage 250. In one embodiment, the at least one remote device 200 further includes a speaker for playing audio. The at least one remote device 200 is preferably operable to replay the image data, the video data, and/or the audio data.

The local storage 250 on the at least one remote device 200 preferably includes a user profile 252. The user profile 252 stores user preferences and information including, but not limited to, user information (e.g., name, email address, phone number, address, contact information), information related to tags connected to assets associated with the user profile, information related to the assets, financial data (e.g., credit card information, bank account information, credit limit), permissions, priorities, groups, group membership, environmental data, and/or location data. The historical data 254 includes, but is not limited to, previous assets, previous tags, and historical data related to previous and/or current assets and tags (e.g., environmental data related to the previous and/or current assets and tags).

Tags

Figure 2:
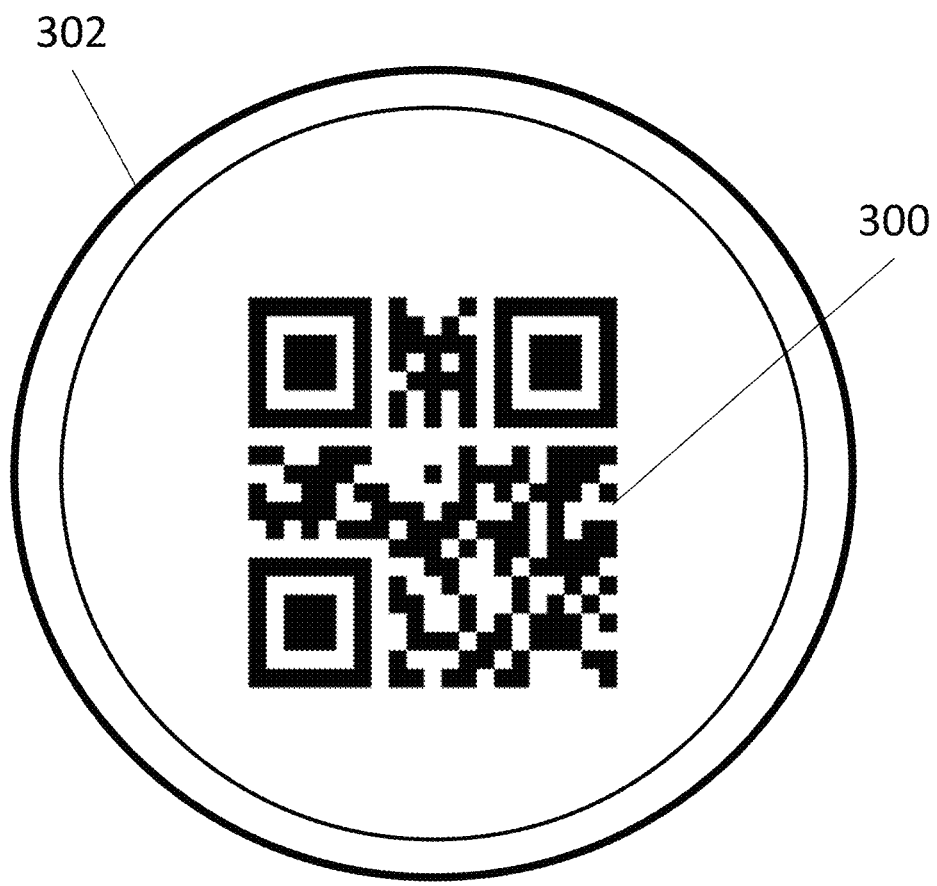
FIG. 2 illustrates one embodiment of a tagged asset

FIG. 2 illustrates one embodiment of a tagged asset. At least one asset 302 is operable to have at least one tag 300 affixed to it.

An asset is a non-network enabled item of the user that is operable to be connected to the intelligent asset management system. Non-network enabled items are things which do not have the capability for independent network connectivity including, but not limited to, medical equipment (e.g., stretchers, defibrillators, surgery tools), manufacturing items (e.g., boxes or pallets of inventory, forklift, generator, excavators), office equipment (e.g., monitors, cables, calculators), hospitality assets (e.g., pool equipment, vacuum cleaners), and/or tools. Non-network enabled items also are things that are not electrical including, but not limited to, furniture, art pieces, historical artifacts, antiques of any kind, sports memorabilia, and/or portable equipment (e.g., pressure washer). The tag 300 is irremovably or removably attached to the asset 302.

In one embodiment, tagging uses automatic identification and data capture (AIDC) technologies. AIDC refers to the methods of automatically identifying objects, collecting data about the objects, and entering data into computer systems, without human involvement. Technologies considered as part of AIDC include, but are not limited to, Near Field Communications (NFC), Quick Response (QR) codes, bar codes, radio frequency identification (RFID), Universal Product Code (UPC), biometrics, magnetic strips, Optical Character Recognition (OCR), smart cards, video analysis, and/or voice recognition.

AIDC is the process of obtaining external data, through the analysis of images, sounds, or videos. To capture data, a transducer is employed which converts an actual image, a video, and/or a sound into a digital file. The digital file is then stored and later analyzed by a computing device or compared against other files in a database to verify identity or to provide authorization to enter a secured system.

In one embodiment, the tag is a QR code. QR codes are a type of matrix barcode, or two-dimensional (2D) barcode. QR codes contain data for a locator, identifier, and/or tracker that connects to a website or application. A QR code uses four standardized encoding modes (numeric, alphanumeric, byte/binary, and kanji) to share data efficiently. QR codes enable anything to be turned into an interaction point capable of performing a digital task or experience.

In another embodiment, the tag is a barcode.

In another embodiment, the tag is a Stock Keeping Unit (SKU).

In another embodiment, the tag is a UPC tag.

In another embodiment, the tag is a magnetic tag.

In another embodiment, the tag is a near field communication (NFC) tag. NFC is a set of communication protocols that enable two devices to establish communication by bringing the devices close to each other.

In one embodiment, the tag is an RFID tag. RFID uses electromagnetic fields to automatically identify and track tags attached to objects. The tags contain electronically stored information. Passive tags collect energy from a nearby RFID reader's interrogating radio waves. Active tags have a local power source and operate remotely from an RFID reader. Unlike a barcode, the tags do not need to be within a line of sight of the RFID reader. In one embodiment, the RFID tag is embedded in an object.

In one embodiment, the tag is a combination of an RFID tag and a QR code. In another embodiment, the tag is a combination of an NFC tag and a QR code.

In one embodiment, a tag uses a Passive Reader Active Tag (PRAT) system. A PRAT system has a passive reader which only receives radio signals from active tags. The reception range of a PRAT system reader is operable to be adjusted from about 1 foot to about 2,000 feet.

In one embodiment, a tag uses an Active Reader Passive Tag (ARPT) system. An ARPT system uses an active reader, which transmits interrogator signals and also receives authentication replies from passive tags.

In one embodiment, a tag uses an Active Reader Active Tag (ARAT) system. An ARAT system uses active tags that are awoken with an interrogator signal from an active reader. In another embodiment, the ARAT system uses a Battery-Assisted Passive (BAP) tag, acting like a passive tag but with a small battery to power the tag's return reporting signal.

In another embodiment, the tag is a chipless RFID tag. Chipless RFID tags are RFID tags that do not require a microchip in the transponder. Chipless RFID tags use either time-domain reflectometry or frequency signature techniques. In time-domain reflectometry techniques, the interrogator sends a pulse and listens for echoes. The time of pulse arrivals encodes the data. In frequency signature techniques, the interrogator sends waves of several frequencies, a broadband pulse or a chirp, and monitors the echoes' frequency content. The presence or absence of certain frequency components in the received waves encodes the data. Chemicals, magnetic materials, or resonant circuits are used to attenuate or absorb radiation of a particular frequency.

In one embodiment, the tag is a SNAPTAG. A SNAPTAG is a 2D mobile barcode alternative similar to a QR code, but uses an icon or company logo and code ring rather than a square pattern of black dots. A SNAPTAG is operable to be used to take consumers to a brand's website or mobile application, and is also operable to facilitate mobile purchases, coupon downloads, free sample requests, video views, promotional entries, FACEBOOK likes, PINTEREST Pins, and/or TWITTER Follows, Posts, and Tweets. In addition, a SNAPTAG offers back-end data mining capabilities. See, e.g., U.S. Pat. Nos. 8,094,870; 8,462,986; 8,971,566; and 9,336,474, each of which is incorporated herein by reference in its entirety.

In another embodiment, the tag is a combination of at least two tag types including, but not limited to, NFC tags, RFID tags, QR codes, SNAPTAGS, ARAT tags, Chipless RFID tags, PRAT tags, barcode, and/or SKU.

In yet another embodiment, the tag is a single tag with at least two of the previously mentioned tagging technologies built into the single tag. For example, older mobile devices do not have NFC capabilities and would only be operable to interact with a QR code. Another example includes combining UPC and NFC in one tag. In this example, a UPC code is already assigned to an asset as a general reference (e.g., a 750 mL bottle of JACK DANIELS) and the NFC code gives that asset a specific and unique serial number. Advantageously, this embodiment allows for the tag to be operable using legacy technologies.

Tag size, shape, and/or color are operable to vary. In one embodiment, a tag is operable for indoor and/or outdoor use. In another embodiment, a tag is permanent. In another embodiment, a tag is temporary. In yet another embodiment, a tag is a custom design and/or custom text defined by a user. In yet another embodiment, the tag is a logo.

Tags operable for indoor use include, but are not limited to, direct thermal paper tags, direct thermal plastic tags, thermal transfer paper tags, thermal transfer plastic tags, thermal transfer polyester tags, synthetic tags, chemical-resistant polyester tags, retro-reflective tags, gloss-coated plastic tags, paper tags, litho paper tags, high gloss paper tags, semi-gloss paper tags, foil paper tags, vinyl tags, static cling vinyl tags, polypropylene tags, polyethylene tags, flexible printed circuit tags, silicone tags, polyimide tags, acrylonitrile butadiene styrene (ABS) tags, aluminum tags, copper tags, metal coil tags, fluorescent tags, permanent adhesive tags, tags with a removable adhesive, and/or tags with a repositionable adhesive.

Tags operable for outdoor use include, but are not limited to, polyethylene tags, flexible printed circuit tags, silicone tags, polyimide tags, ABS tags, paper tags, aluminum tags, copper tags, metal coil tags, tags where the graphics are sealed beneath a sapphire-hard anodic layer of metal, laminated tag stickers, high-temperature metal tags, stainless steel tag labels, polyester tags with a permanent pressure-sensitive adhesive, and/or tags requiring a one-time application of a paint mask.

In one embodiment, tags are water-resistant and/or waterproof. Additionally, or alternatively, tags are operable to be used in temperatures between about −30° C. (−22° F.) and about 60° C. (140° F.). In another embodiment, tags are operable to be used in temperatures up to 870° C. (1598° F.). In yet another embodiment, tags are operable to be used in temperatures up to 1510° C. (2750° F.).

In one embodiment, the tag incorporates at least two types of indoor and/or outdoor tag types and/or technologies.

In one embodiment, the tag further includes at least one sensor and is configured for network communication with the at least one remote server, the at least one mobile device, the at least one smart disc, and/or the at least one hub. The at least one sensor includes, but is not limited to, a location sensor (e.g., global position system (GPS) device), an environmental sensor (e.g., a temperature sensor, a humidity sensor, an accelerometer, a light sensor, an ultraviolet (UV) sensor, a noise sensor, a radiation sensor, a chemical sensor (e.g., airborne chemicals)), a weight sensor, a size sensor, a pressure sensor, an image and/or video sensor (e.g., a camera), and/or an audio sensor (e.g., a microphone). This allows for the tag to collect and analyze environmental data, location data, image data, video data, and/or audio data related to the tag and/or asset and transmit the environmental data, the location data, the image data, the video data, and/or the audio data to the at least one remote server, the at least one remote device, the at least one smart disc, and/or the least one hub. Additional details about location and environmental sensors and intelligence, tokenization, and virtual representations of assets are included in U.S. Provisional Patent Application No. 63/356,744 and U.S. Provisional Patent Application No. 63/356,776, each of which is incorporated herein by reference in its entirety.

Figure 3:
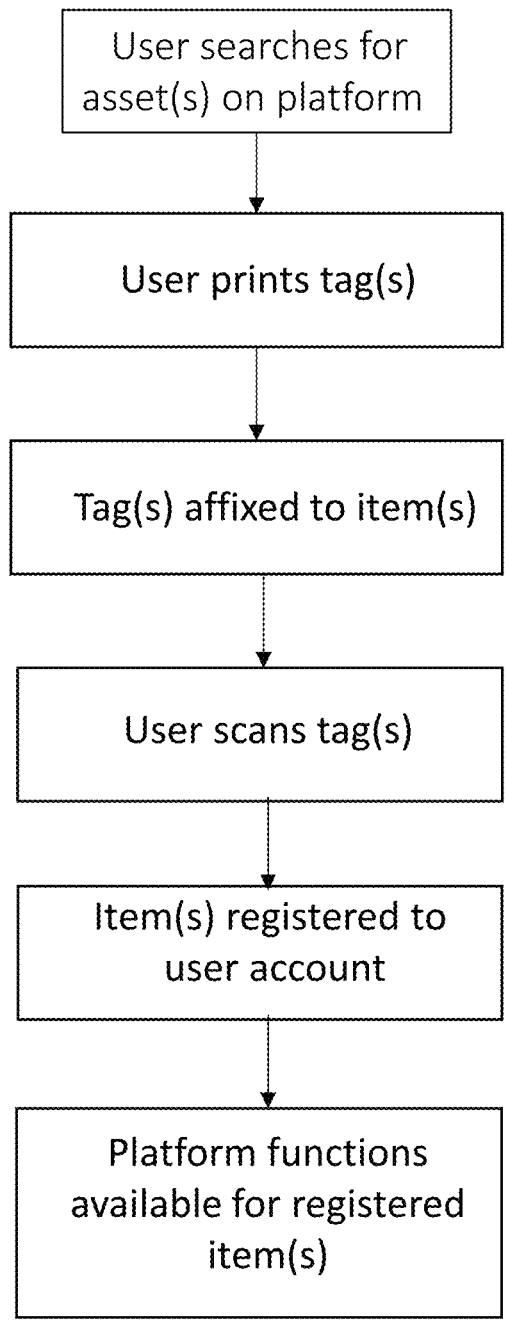
FIG. 3 illustrates one embodiment of a method for connecting and registering an asset.

FIG. 3 illustrates one embodiment of a method for connecting and registering an asset. In one embodiment, an intelligent asset management platform is operable to be searched for at least one asset by a user. The platform returns the results of the search, wherein at least one search result matches the at least one asset. In one embodiment, the platform is operable to select the at least one search result matching the at least one asset based on user input. In one embodiment, the platform is operable to print at least one tag for the at least one asset. The at least one tag is affixed or attached to the at least one asset by the user. In one embodiment, using a remote device (e.g., smartphone, tablet), the at least one tag on the at least one asset is scanned into the platform by the user. The scanned asset is then registered to the user's account. In one embodiment, the scanned asset is automatically registered to the user's account. In another embodiment, the scanned asset is manually registered to the user's account, enabling the editing of scanned asset information. In an alternative embodiment, tags are available for a user to purchase. Once a tag has been acquired by the user (e.g., purchased), the tag is operable to be attached to an asset by the user. After tagging the asset, the remote device is operable to scan the at least one tag and/or the at least one asset to associate the tag with the user account. In one embodiment, the platform prompts for information regarding the tagged asset to be input into the remote device by the user. Information regarding the tagged asset includes, but is not limited to, an identity, a color, a condition, a size, a weight and/or a shape of the tagged asset. In an alternative embodiment, information regarding the tagged asset is automatically collected by the platform when the tagged asset is scanned using a camera associated with the remote device (e.g., a smartphone camera). In one embodiment, the platform provides a prompt on the remote device to take an image and/or video of the tagged asset using the associated camera (e.g., the smartphone camera). The media is then associated with the tagged asset and processed by the platform to determine information regarding the tagged asset. The platform then automatically associates this information with the tagged asset. In one embodiment, the platform incorporates computer vision to automatically collect the information regarding the tagged asset. In one embodiment, if information cannot be determined by the platform automatically, the platform prompts for any information about the tagged asset that could not be identified by the platform. In another embodiment, the platform prompts for confirmation about the information obtained through the scan (e.g., using computer vision).

The platform enables a variety of functions to be performed for tagged assets registered with the platform including, but not limited to, selling the at least one tagged asset, trading the at least one tagged asset with at least one other user, loaning the at least one tagged asset to at least one other user, locating accessories for the at least one tagged asset, locating add-ons for the at least one tagged asset, tracking and selling services for the at least one tagged asset, tracking maintenance on the at least one tagged asset, marketing upgrades for the at least one tagged asset, selling upgrades for the at least one tagged asset, marketing affiliated products and services for the at least one tagged asset, selling affiliated products and services for the at least one tagged asset, creating social communities for the at least one tagged asset, sharing information related to the at least one tagged asset on at least one linked social media account, authenticating the at least one tagged asset, tracking the location of the at least one tagged asset, accessing self-service for the at least one tagged asset, accessing support for the at least one tagged asset, and/or tracking the engagement of other users for the at least one tagged asset. Additional details about the marketplace are included in U.S. patent application Ser. No. 17/119,506, which is incorporated herein by reference in its entirety.

Figure 4:
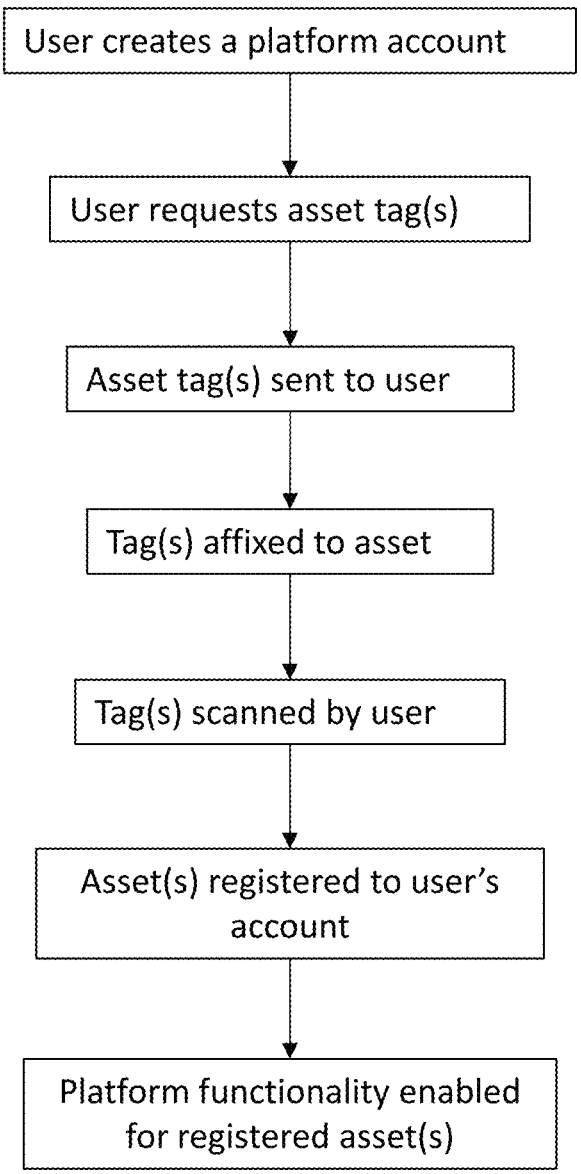
FIG. 4 illustrates another embodiment of a method for connecting and registering an asset.

FIG. 4 illustrates another embodiment of a method for connecting and registering an asset. In one embodiment, an account for the intelligent asset management platform and/or application is created on the platform by a user, at least one asset tag is requested from the intelligent asset management platform and/or application for at least one asset by the user, the at least one asset tag is sent to the user (e.g., printing, mail), the at least one asset tag is affixed to at least one asset by the user, the at least one asset tag is scanned using at least one user device (e.g., remote device), the at least one tagged asset is registered to the user's account, and platform functionality is enabled for the at least one tagged asset registered with the platform.

In one embodiment, an asset with a tag already affixed to it is acquired by a user. The tag is scanned using a remote device in order to connect and register the asset to the user's account. In a preferred embodiment, the remote device is in network communication with the application and/or the platform.

The tag is operable to authenticate the tagged asset, validate ownership of the tagged asset, track supply chain origin of all components of the tagged asset, and/or ensure the sustainability of the tagged asset.

Smart Disc

In one embodiment, a tagged asset is operable to interact with a smart disc. The smart disc is operable to read the tag data, weigh or measure the tagged asset, and/or confirm tag data using alerts including, but not limited to, sound, light, and/or sending an alert and/or notification to a remote device. In one embodiment, the smart disc includes a camera and/or a microphone to capture video data, image data, and/or audio data. In one embodiment, the smart disc includes at least one environmental sensor to capture environmental data and/or at least one location sensor to capture location data.

Figure 5:
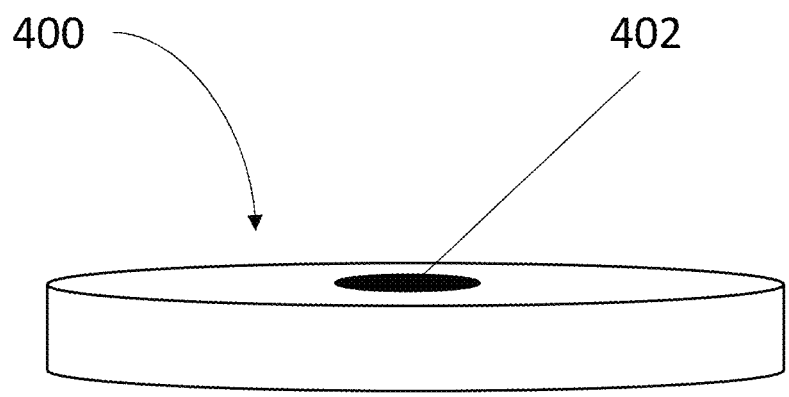
FIG. 5. illustrates one embodiment of a smart disc.

FIG. 5 illustrates one embodiment of a smart disc of the present invention. The smart disc 400 is operable to acquire data associated with a tagged asset including, but not limited to, measurements, weight, mass, dimensions, humidity, location, temperature, and/or density. For example, and not limitation, the smart disc 400 is operable to acquire a weight of a tagged asset. The smart disc 400 includes at least one tag sensor 402, wherein the at least one tag sensor 402 is operable to acquire tag data using technologies including, but not limited to, NFC tags, QR codes, RFID tags, OCR tags, photographs, video, infrared (IR) images, magnetic tags, smart card tags, and/or voice capturing technologies.

In one embodiment, whenever a tagged asset is placed on the smart disc or within range of the smart disc, the tag sensor in the smart disc acquires data relating to the condition of the tagged asset. This tracks details about the tagged asset every time it is placed on the smart disc or within range of the smart disc. The data acquired by the smart disc is then sent directly to the platform and stored in the at least one database. In one embodiment, the data acquired by the smart disc is transmitted to the platform in real time or near-real time.

In one embodiment, the smart disc is operable to connect directly to at least one other smart disc using network communication techniques and technologies, including, but not limited to, BLUETOOTH, NFC, cellular communication, and/or WI-FI. In one embodiment, a first smart disc is operable to transmit information associated with a tagged asset to a second smart disc.

In one embodiment, the smart disc is operable for network communication with the platform using cloud computing techniques and technologies. The smart disc connects to the platform directly using integrated network and/or cellular communication. In addition, the smart disc is operable for network communication with a data storage device and/or the remote device (e.g., using BLUETOOTH and/or WI-FI), wherein the data storage device is in network communication with the platform. In one embodiment, the data storage device is a local data storage device.

In another embodiment, the smart disc is connected to a cellular network. In one embodiment, the smart disc is Long-Term Evolution (LTE) connected. In another embodiment, the smart disc is connected to a Fifth Generation (5G) network.

In one embodiment, the smart disc is battery-operated. In another embodiment, the smart disc is powered using solar energy. In another embodiment, the smart disc is powered by a rechargeable battery. In yet another embodiment, the smart disc is powered by solar energy and at least one battery. In still another embodiment, the smart disc is powered by alternating current (AC) power and/or direct current (DC) power.

In one embodiment, each smart disc is waterproof. Alternatively, the smart disc is water-resistant.

In one embodiment, the smart disc is operable to send acquired data to the platform in real-time or near real-time. Alternatively, the smart disc is operable to send acquired data to the platform at a set interval (e.g., every 30 minutes, every hour, a predefined number of days, etc.) and/or after a measurement is taken.

In one embodiment, the smart disc is operable to determine when a tagged asset is located outside of a specified area and/or a threshold distance (e.g., radius) between the tagged asset and the smart disc using network communication techniques and technologies, including, but not limited to, BLUETOOTH, RFID, NFC, cellular communication, and/or WI-FI. In one embodiment, the system is operable to provide an alert (e.g., to the remote device) that the tagged asset is located outside of the specified area and/or the threshold distance between the tagged assets and the smart disc.

Figure 6:
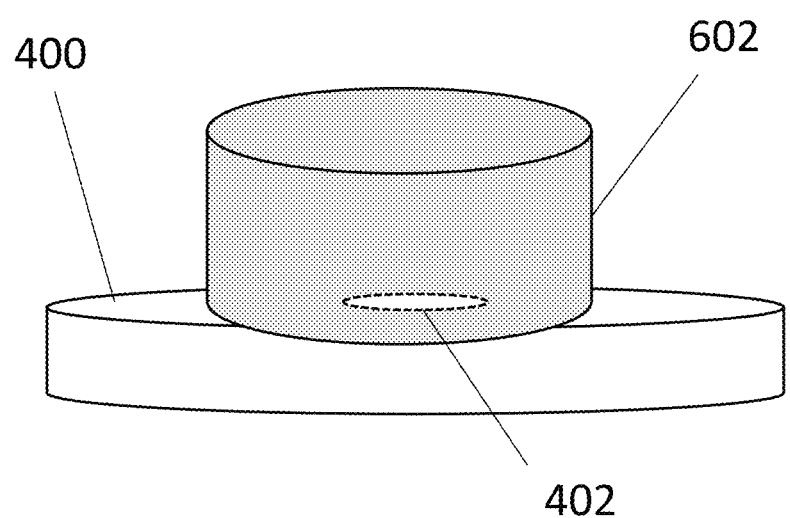
FIG. 6 illustrates one embodiment of a smart disc associated with a tagged asset.

FIG. 6 illustrates one embodiment of a smart disc interacting with a tagged asset. At least one smart disc 400 is operable to interact with at least one tagged asset 602 when the at least one tagged asset 602 is placed on or within range of the at least one smart disc 400, wherein the at least one smart disc 400 includes at least one tag sensor 402. The at least one tag sensor 402 is operable to read data from the at least one tagged asset 602 and/or write data to the at least one tagged asset 602 (e.g., firmware update).

Hub

In some embodiments, the system of the current invention includes at least one hub. In one embodiment, the at least one hub enables network communication between the platform and at least one smart disc and/or at least one tag. In one embodiment, the at least one hub enables network communication between at least two smart discs, wherein the hub is in network communication (e.g., wireless network communication) with the Internet. In one embodiment, the system provides wireless network communication including, but not limited to, BLUETOOTH, NFC, and/or WI-FI. In one embodiment, the at least one hub is further operable for network communication (e.g., wired or wireless) with the at least one platform. In one embodiment, the at least one hub includes a camera and/or a microphone to capture video data, image data, and/or audio data.

Figure 7:
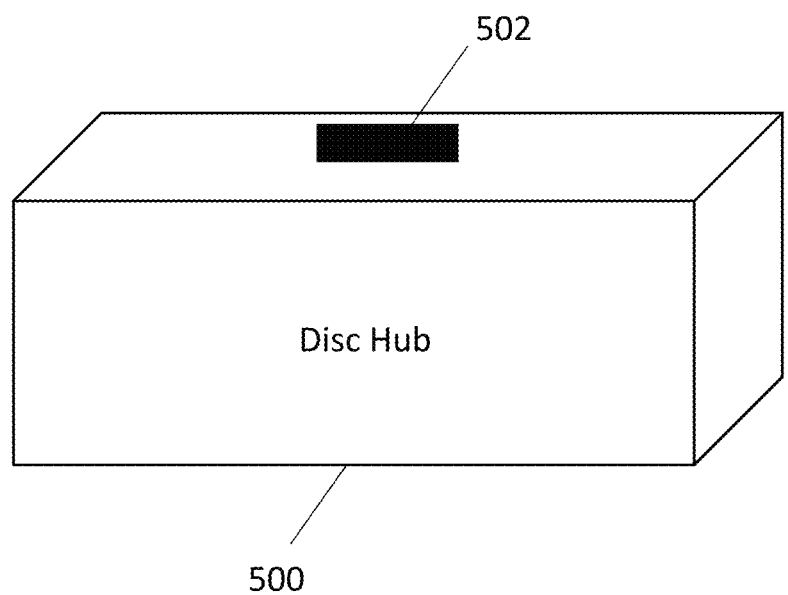
FIG. 7 illustrates one embodiment of a hub.

FIG. 7 illustrates one embodiment of a hub of the present invention. The hub 500 is operable to acquire data associated with a tagged asset including, but not limited to, image data, video data, and/or audio data. The hub 500 includes at least one hub sensor 502, wherein the at least one hub sensor 502 is operable to acquire tag and/or disc data using technologies including, but not limited to, NFC tags, QR codes, RFID tags, OCR tags, environmental sensors, location sensors, image sensors, video sensors, audio sensors, infrared (IR) image sensors, magnetic tags, smart card tags, and/or voice capturing technologies.

In an alternative embodiment, the hub enables network communication between at least one tag and the platform. In one embodiment, the hub enables network communication between at least two tags, wherein the hub is in network communication (e.g., wired or wireless) with the Internet. In one embodiment, the at least one tag is further operable for network communication with the at least one platform (e.g., independent of the hub).

Image Data

In preferred embodiments, the platform is operable to associate image data with a tagged asset. Image data is operable to be collected by one or more cameras including, but not limited to, a mobile phone camera, Light Detection and Ranging (LiDAR), RADAR, charge-coupled device (CCD), electron multiplying charge-coupled device (EMCCD), complementary metal-oxide semiconductor (CMOS), short-wave infrared (SWIR), X-RAY, wavefront, thin film, infrared, quantum dot, or other type of imaging sensor or camera. Cameras used to collect image data are operable to be associated with a tag, a smart disc, a hub, and/or a remote device. In a preferred embodiment, image data is collected using a remote device associated with a user profile and saved to an application (e.g., on the remote device) and/or the platform.

Once image data is collected and/or uploaded, it is operable to be associated with a tagged asset. In one embodiment, the platform associates image data with tagged assets by storing the information in a database. Once associated with a tagged asset, the image data is operable to be easily obtained by the platform to present the associated data seamlessly upon request (e.g., via a graphical user interface (GUI)). Advantageously, this allows for ease of use to access data regarding an asset by a user. In one embodiment, the system is operable to obtain image data by connecting to at least one network-enabled device that includes a camera. This includes, but is not limited to, a smart home security system or other network-enabled security system associated with the user profile.

Advantageously, different cameras and/or image sensors are operable to provide different image data. For example, and not limitation, LiDAR is operable to provide images under dark conditions (e.g., pitch dark) and an infrared camera is operable to provide temperature information. In one embodiment, images are operable to be associated (e.g., automatically) with a tag. For example, and not limitation, if a picture of a tagged asset is posted on the Internet, the platform is operable to crawl the Internet to find an image that has location data saved with the image. In one embodiment, the platform is operable to link the image with the tagged asset. In one embodiment, the image is publicly available (e.g., social media). Alternatively, the image is privately available (e.g., secure website accessible by the intelligent asset management platform).

In another example, a picture of a musical artist is taken at a concert and posted to social media. The intelligent asset management platform is operable to comb social media sites to find images of that location because there is at least one tagged asset on the stage. The intelligent asset management platform is operable to link the picture to the at least one tagged asset. In yet another example, a tourist takes a picture of seals in San Francisco harbor and posts the picture to a social media account. The platform finds the picture because it has a location close to at least one tagged asset and the picture is linked to the tag in the platform. In still another example, a model of a pressure washer (e.g., Honda 2020 model 42X) is tagged without a picture. The platform is operable to search the Internet for a picture of the model of the pressure washer (e.g., Honda 2020 model 42X) and automatically associates the picture with the tagged asset.

Video Data

In preferred embodiments, the platform is operable to associate video data with a tagged asset. Video data is operable to be collected by one or more cameras. In one embodiment, the one or more cameras include, but are not limited to, a mobile phone camera, LiDAR, RADAR, CCD, EMCCD, CMOS, SWIR, X-RAY, wavefront, thin film, infrared, quantum dot, or other type of video imaging sensor or video camera. Cameras used to collect video data are operable to be associated with a tag, a smart disc, a hub, and/or a remote device. In a preferred embodiment, video data is collected using a remote device associated with a user and saved to an application and/or the platform. In a further preferred embodiment, the video data also incorporates audio data recorded by a microphone associated with the remote device, tag, smart disc, and/or hub and synchronized with the video data.

Once video data is collected and/or uploaded, it is operable to be associated with a tagged asset. In one embodiment, the platform associates video data with tagged assets by storing the information in a database. Once associated with a tagged asset, the video data is operable to be easily obtained by the platform to present users with the associated data seamlessly upon request. Advantageously, this allows ease of use to access data regarding an asset (e.g., via a graphical user interface (GUI)). In one embodiment, the system is further operable to obtain video data by connecting to at least one network-enabled device that includes a camera. This includes, but is not limited to, a smart home security system or other network-enabled security system associated with the user profile. In such embodiments, the video data is operable to be associated with the tagged asset if the tag and/or asset are within view of the camera.

In one embodiment, videos are operable to be associated (e.g., automatically) with a tag. For example, and not limitation, if a video of a tagged asset is posted on the Internet, the platform is operable to crawl the Internet to find a video that has location data saved with the video. In one embodiment, the platform is operable to link the video with the tagged asset. In one embodiment, the video is publicly available (e.g., social media). Alternatively, the video is privately available (e.g., secure website accessible by the intelligent asset management platform).

In another example, a video of a musical artist is taken at a concert and posted to social media. The intelligent asset management platform is operable to comb social media sites to find videos and/or images of that location because there is at least one tagged asset on the stage. The intelligent asset management platform is operable to link the video to the at least one tagged asset. In yet another example, a tourist takes a video of seals in San Francisco harbor and posts the video to a social media account. The platform finds the video because it has a location close to at least one tagged asset and the picture is linked to the tag in the platform.

Audio Data

In preferred embodiments, the platform is operable to associate audio data with a tagged asset. Audio data is operable to be collected by one or more microphones. Microphones used to collect audio data are operable to be associated with a tag, a smart disc, a hub, and/or a remote device. In a preferred embodiment, audio data is collected using a remote device associated with a user and saved to an application and/or the platform.

Once audio data is collected and/or uploaded, it is operable to be associated with a tagged asset. In one embodiment, the platform associates audio data with tagged assets by storing the information in a database. Once associated with a tagged asset, the audio data is operable to be easily obtained by the platform to present the associated data seamlessly upon request. Advantageously, this allows ease of use to access data regarding an asset (e.g., via a graphical user interface (GUI)). In one embodiment, the system is further operable to obtain audio data by connecting to at least one network-enabled device that includes a microphone. This includes, but is not limited to, a smart home security system or other network-enabled security system associated with the user profile. In such embodiments, the audio data is operable to be associated with the tagged asset and/or a group of tagged assets based on its proximity to the tagged asset(s).

Application

As previously described, the at least one tag and/or the at least one tagged asset are registered with an intelligent asset management platform. The intelligent asset management platform preferably provides a graphical user interface (GUI) operable for user interaction.

In one embodiment, the intelligent asset management platform includes a mobile application. In one embodiment, the mobile application is a native mobile application. Native mobile applications are built for a specific platform with the platform Software Development Kit (SDK), tools, and languages, typically provided by the platform vendor. Examples include, but are not limited to, xCode/Objective-C for iOS, Eclipse/Java for Android, Visual Studio/C# for Windows Phones. In another embodiment, the mobile application is a mobile web (Mobile Web) application. Mobile Web applications are server-side applications, built with any server-side technology including, but not limited to, PHP, Node.js, and ASP.NET, that render Hypertext Markup Language (HTML) that has been styled so that it renders well on a device form factor.

In another embodiment, the at least one tag and/or the at least one tagged asset is connected to the intelligent asset management platform via a web interface.

In another embodiment, the intelligent asset management platform includes a hybrid mobile application (Hybrid App). A Hybrid App is an application that is written with the same technology used for websites and mobile web implementations, and that is hosted or runs inside a native container on a mobile device. Hybrid Apps use a web view control to present the HTML and JAVASCRIPT files in a full-screen format, using the native browser rendering engine and not the browser itself. For example, WEBKIT is the browser rendering engine that is used on IOS, ANDROID, BLACKBERRY, SAFARI, MAIL, APP STORE, and others. This means that the HTML and JAVASCRIPT used to construct a Hybrid App are rendered/processed by the WEBKIT rendering engine and displayed to the user in a full-screen web view control, not in a browser. In addition, Hybrid Apps implement an abstraction layer that exposes the device capabilities, native Application Programming Interfaces (APIs), to the Hybrid App as a JAVASCRIPT API. This is not possible with Mobile Web application implementations because of the security boundary between the browser and the device APIs. Through this abstraction layer, a common set of APIs is exposed in JAVASCRIPT, and these JAVASCRIPT APIs work on any device supported by the framework.

In one embodiment, the browser rendering engine is Gecko. In another embodiment, the browser rendering engine is Goanna. In another embodiment, the browser rendering engine is KHTML. In another embodiment, the browser rendering engine is Presto. In another embodiment, the browser rendering engine is Tasman. In another embodiment, the browser rendering engine is Trident. In another embodiment, the browser rendering engine is Blink. In yet another embodiment, the browser rendering engine is Servo. In yet another embodiment, the browser rendering engine is EdgeHTML. In another embodiment, the application includes both a remote application and a desktop application.

The present invention is operable to provide applications including, but not limited to, a base application and/or an SDK for custom applications. The SDK for custom applications enables functionality including, but not limited to, registration, selling, support, maintenance, service, education, and/or marketing.

The application is operable to tag assets, register tagged assets to the platform, and/or manage tagged assets.

Authentication

For sensitive applications, adding a second authentication method and/or factor is appropriate (also known as "two-factor authentication"). This includes applications that provide access to sensitive information (e.g., credit card numbers, bank account information) or allow transfer of funds. Mobile applications use HyperText Transfer Protocol (HTTP) as the transport layer. The HTTP protocol itself is stateless, so there must be a way to associate a user's subsequent HTTP requests with that user; otherwise, the user's log in credentials would need to be sent with every request. In one embodiment, the second authentication method is stateful authentication. Stateful authentication generates a unique session ID when the user logs in. In subsequent requests, this session ID serves as a reference to the user details stored on the server. The session ID is opaque, in that it does not contain any user data. In one embodiment, the session ID is random. In one embodiment, the second authentication method is stateless authentication. With stateless authentication, all user-identifying information is stored in a client-side token. The token is passed to any server or micro service, eliminating the need to maintain a session state on the server. Stateless authentication is often factored out to an authorization server, which produces, signs, and encrypts the token upon user login.

In one embodiment, the second authentication method is an additional user password, wherein the additional user password is distinct from the user's original account password. In one embodiment, the second authentication method is a PIN number. In another embodiment, the second authentication method is a user-created pattern on a mobile computing device. In yet another embodiment, the second authentication method is a one-time password generator. In yet another embodiment, the second authentication method is a hardware token generating a one-time password. In yet another embodiment, the second authentication method is user biometric data. User biometric data includes, but is not limited to, a fingerprint, a retinal scan, a haptic vein scan, facial recognition, voice recognition, and/or ear recognition. In one embodiment, the second authentication method is a passive contextual authentication. The passive contextual authentication includes, but is not limited to, geolocation, IP address, time of day, and/or the device being used by the user (e.g., MAC address).

In one embodiment, the second authentication method uses the OWASP Mobile AppSpec Verification Standards (MASVS). MASVS is split into two authentication levels. In one embodiment, the MASVS level is level one. Level one MASVS functions with non-critical applications and suggests the following authentication requirements: if the app provides users with access to a remote service, an acceptable form of authentication such as username and/or password authentication is performed at the remote endpoint; a password policy exists and is enforced at the remote endpoint; the remote endpoint implements an exponential back-off, or temporarily locks the user account when incorrect authentication credentials are submitted an excessive number of times.

In one embodiment, the MASVS level is level two. Level two MASVS functions with sensitive applications and includes the following, in addition to the level one requirements: a second factor of authentication exists at the remote endpoint and the second factor authentication requirement is consistently enforced; step-up authentication is required to enable actions that deal with sensitive data and/or transactions; the application informs the user of the recent activities with their account when they log in.

In one embodiment, two-factor authentication (2FA) functionality is enabled (e.g., via user input).

In another embodiment, single sign-on (SSO) functionality is enabled (e.g., via user input). SSO is a property of access control of multiple related, yet independent software systems. With this property, a user logs in with a single ID and password to gain access to any of several systems. In one embodiment, SSO uses a Lightweight Directory Access Protocol (LDAP) and stored LDAP databases on servers. In another embodiment, SSO uses cookies. In one embodiment, SSO is Kerberos-based, wherein the initial sign-on prompts the user for credentials and gets a Kerberos ticket-granting Ticket (TGT). In one embodiment, SSO is smart-card-based, wherein initial sign-on prompts the user for the smart card. Additional software applications also use the smart card, without prompting the user to re-enter credentials. Smart-card-based SSO is operable to use certificates and/or passwords stored on the smart card. In one embodiment, SSO is based on a Security Assertion Markup Language (SAML). SAML is an XML-based method for exchanging user security information between an SAML identity provider and a SAML service provider.

User account information is operable for editing after the account is created. In addition, the platform provides an account profile page (e.g., via the GUI). The account profile page is operable to display information associated with the user's account including, but not limited to, available payment methods, a list of tagged assets registered with the user account, user account settings, user reviews, and/or shortcuts to the user's dashboard.

In one embodiment, an existing social media account is linked to the intelligent asset management platform. Examples of social media accounts operable to be linked with the platform include, but are not limited to, META, FACEBOOK, TWITTER, INSTAGRAM, SNAPCHAT, LINKEDIN, TUMBLR, PINTEREST, SINA WEIBO, REDDIT, TIKTOK, VKONTAKTE, FLICKR, MEETUP, INTERNATIONS, XING, and/or NEXTDOOR.

After an account is created, a tagged asset is operable to be registered with a user's account by scanning and/or reading the tag associated with the tagged asset.

Additionally, the intelligent asset management platform allows actions including, but not limited to, selling tagged assets associated with the user account, buying tagged assets from other user accounts, loaning tagged assets to other users, borrowing tagged assets from other users, renting tagged assets to other users, renting tagged assets from other users, trading tagged assets with other users, reviewing tagged assets, and/or reviewing purchased tagged assets.

Once registered, tagged assets associated with a user account are listed on the intelligent asset management platform. In one embodiment, a tagged asset's view is set to private, wherein only user-selected accounts have access to the tagged asset's information. In another embodiment, a tagged asset's view is set to public, wherein any user of the intelligent asset management platform is allowed to view the tagged asset's information. Tagged asset information includes, but is not limited to, manufacturer(s), model number, product name, date of packaging, previous ownership, current market value, historical market value, previous purchase price(s), purchase date(s), asset condition, current location, asset review score, serial number, weight, size, SKU number, warranty expiration date, and/or custom user notes.

Tagged assets registered with the platform are operable to be associated with a manufacturer of the tagged asset. The platform is operable to provide alerts and/or reminders about events associated with a tagged asset, including, but not limited to, maintenance, repair(s), selling and/or offering product refills associated with the tagged asset, availability of accessories, and/or add-ons for the tagged asset, services associated with the tagged asset, and/or loan date.

Tagged assets that are associated with a user account are operable to be associated with image data, video data, and/or audio data. This data is further operable to be processed and analyzed by the system to acquire image, video, and audio intelligence. The intelligence is further operable to be associated with a tagged asset to provide the user with insights regarding the tagged asset. Actions include, but are not limited to, an alert (e.g., short message service (SMS) messages, push notifications, in-app messages, rich communication services, emails, etc.) and/or actions sent to other network-enabled devices (e.g., smart cars, smart televisions, smart air conditioners, smart trains, etc.). Additional details regarding the data collected by the system and intelligence gathered within the system are presented below.

Account Types

In some embodiments, the platform includes more than one user account type. Examples of such account types include, but are not limited to, an administrator, an employee, an owner, a manager, a repair person, a maintenance person, a security guard, a parent, a child, a teacher, a student, a general user, etc. In one embodiment, the platform provides different permissions based on the account type. In a non-limiting example, a parent and a child create accounts on the application. The parent is listed as a parent to the child and is permitted full access to the child account. The parent account is operable to both track and collect data on tagged assets associated with both the child account and the parent account. In a further non-limiting example, a child account is not able to tag any new assets and/or any new assets of a specific class unless a parent account assigns the asset to the child or enters credentials of the parent account to provide permission to the child account. In another non-limiting example, a parent account is operable to set actions for tagged assets associated with both the child account and the parent account while the child account is only allowed to set actions for tagged assets associated with the child account. In one embodiment, a parent account is operable to lock certain tagged assets associated with the child account to prevent the child account from assigning actions to tagged assets other than those allowed by the parent. Similar permission rules are operable to be enforced for relationships other than parent-child including, but not limited to, administrator-employee, teacher-student, etc.

Permission rules are preferably designated for each associated account and are operable to be different for similar account types. For example, an administrator account is associated with a first employee account, a second employee account, and a third employee account having a first set of permissions, a second set of permissions, and a third set of permissions, respectively. The first set of permissions is not equivalent to the second set of permissions, and the second set of permissions is not equivalent to the third set of permissions.

In one embodiment, the platform allows for fractional ownership of an asset. In one embodiment, the permission rules governance of the fractional ownership of the asset. For example, and not limitation, a first owner has an 80% interest in an asset and a second owner has a 20% interest in the asset. The first owner is authorized to sell the asset. In one example, the first owner requires permission from the second owner to sell the asset. Alternatively, the first owner does not require permission from the second owner to sell the asset. The platform is operable to sell the tagged asset and split the proceeds between the first owner and the second owner (e.g., proportionally according to ownership, according to permission rules). In one example, the platform obtains a commission for the sale of the asset.

Artificial Intelligence

Artificial Intelligence (AI) can be divided into two disciplines: Machine Learning (ML) and Deep Learning (DL). ML involves the creation of computers and software that are operable to learn from data, and then apply that knowledge to brand new data sets. DL creates neural networks, designed to resemble the human brain, and is used to process data including, but not limited to, sounds and images. AI cannot function without data. "Big Data" refers to the massive sets of data that are required and available for AI. Big Data sets are operable to be structured data including, but not limited to, transactional data in a relational database, and less structured or unstructured data, including, but not limited to, images, email data, and/or sensor data. These data sets are operable to be analyzed to find patterns, trends, and facilitate making future predictions and support automation and workflows.

ML algorithms provide effective automated tools for data collection, analysis, and integration. When combined with cloud computing power, ML enables fast and thorough processing and integration of large amounts of various information. ML algorithms are operable to be applied to every element of a Big Data operation including, but not limited to, data labeling and/or segmentation, data analytics, diagnostics, planning, prediction, automation, workflow, and/or scenario simulation.

In one embodiment, AI, ML, and/or DL is used to provide intelligence and information regarding an asset based on image, video, and/or audio data collected from the remote device, the smart disc, the hub, the tag, and/or third-party sources.

In one embodiment, the system utilizes Artificial Intelligence (AI). In one embodiment, the system utilizes deploys Machine Learning (ML). In another embodiment, the system utilizes Deep Learning (DL). In yet another embodiment, the system utilizes AI, ML, DL, and/or combinations thereof.

AI, ML, DL, and/or Big Data enable the system to gather data intelligence, forecast, map, and/or provide market intelligence. In a preferred embodiment, AI, ML, DL, and/or Big Data algorithms are encompassed in the learning engine and/or the analytics engine of the remote server.

In one embodiment, the AI and/or the ML is operable to make recommendations to the user. In another embodiment, the AI and/or the ML is operable to automatically set actions related to the tagged asset to avoid negative events and/or consequences related to the tagged asset. In one embodiment, the AI and/or the ML is operable to use historical data to identify trends in the behaviors of the user, image data, video data, audio data, and/or data related to the tagged asset to make predictions as to future conditions to pre-emptively provide notifications of upcoming events, conditions, and/or threats to related to the tagged asset. In one embodiment, that AI and/or the ML includes one or more natural language processing (NLP) algorithm. Additional details about NLP are disclosed in U.S. patent application Ser. No. 17/317,047, which is incorporated herein by reference in its entirety. The one or more NLP algorithm is operable to analyze audio data (including audio data from video data) and/or text to provide analysis of the meaning of speech and/or language captured in the audio data or written in text. In a preferred embodiment, the at least one NLP algorithm is operable to take feedback from the user as a method of learning as a means to improve its performance.

Workflows and automation are important within the system. The AI and/or the ML is operable to leverage a Bayesian inference engine. The Bayesian inference engine is different from a normal decision tree or a flow process in that every node (tag) connected to the network is operable to infer its state to all other nodes (tags) connected to the network, so every tag knows about every other tag. In one embodiment, only connected tags (e.g., common ownership) or tags with permission to share are operable to share state information. Unlike any other intelligence system, the present invention enables information flow in all directions at all times. This is unlike a left to right logic or branching logic. For example, and not limitation, if the weight of the asset of a first tag is less than 45 kg (99.2 lbs.) and the temperature of the environment of the asset of a second tag is greater than 32° C. (89.6° F.) and it is not raining outside, then open the spigot and water the plants located near the asset of the second tag. The system is operable to make decisions and automate processes for applications including, but not limited to, data collection, data validation, condition monitoring, remote diagnosis, event management, data dashboarding, proactive maintenance, field service optimization, service level agreement (SLA) validation, selling equipment as a service, and/or improving energy efficiency. For workflow, a manufactured or assembled product gets scanned along the process, so the manufactured or assembled product is manufactured or assembled properly before the manufactured or assembled product ships.

Data from a first asset is operable to be affected by data from at least one other asset and/or third-party data. For example, and not limitation, if there are 99 tags registered to a project, the project is not shipped until there are 100 tags registered. In another example, the third-party data includes, but is not limited to, weather data or logistics data (e.g., arrival of a shipping container or truck). Thus, data from a plurality of tags (e.g., thousands, millions) is operable to create unique and previously unavailable intelligence or automation. In yet another example, an image of a first tagged asset illustrates that the red color of the first tagged asset has faded to light red and audio from a second tagged asset determines that a sound of its motor identified a failure two weeks after the second tagged asset faded to light red, the platform provides a notification to submit a work order and/or submits a work order to check the first tagged asset to prevent the failure that was seen in the second tagged asset. The system is operable to make decisions and automate processes for applications including, but not limited to, data collection, data validation, condition monitoring, remote diagnosis, event management, data dashboarding, proactive maintenance, field service optimization, service level agreement (SLA) validation, selling equipment as a service, and/or improving energy efficiency. For workflow, a manufactured or assembled product gets scanned along the process, so the manufactured or assembled product is manufactured or assembled properly before the manufactured or assembled product ships.

Data from a first asset is operable to be affected by data from at least one other asset and/or third-party data. For example, and not limitation, if there are 99 tags registered to a project, the project is not shipped until there are 100 tags registered. In another example, the third-party data includes, but is not limited to, weather data or logistics data (e.g., arrival of a shipping container or truck). Thus, data from a plurality of tags (e.g., thousands, millions) is operable to create unique and previously unavailable intelligence or automation.

Advantageously, the platform is operable to monitor the condition and/or health of a plurality of tagged assets around the world based on image, video, and/or audio analysis of each of the plurality of tagged assets.

Data Processing

Image data, video data, and/or audio data associated with a tagged asset and/or a group of tagged assets are processed and monitored by the system. The platform is operable to process such data using the image processing engine, video processing engine, and audio processing engine respectively to obtain image intelligence, video intelligence, and/or audio intelligence based on the data inputted into the engine.

In one embodiment, image intelligence collected from the image processing engine includes, but is not limited to, asset color, asset size, asset shape, number of assets, text associated with a tagged asset (e.g., text on a box containing the tagged asset), date the image was taken and/or uploaded, time the image was taken and/or uploaded, asset identity, asset age, asset condition (e.g., clean or dirty, broken or not broken, etc.), and/or asset location in relation to other objects in the image. In one embodiment, image intelligence is obtained using machine vision and machine learning. Additional information about image processing and machine vision methods can be found in Sonka, M., Hlavac, V., & Boyle, R. (2014). *Image processing, analysis, and machine vision*. Cengage Learning, which is incorporated herein by reference in its entirety. Additionally, or alternatively, the platform is operable to compare images associated with a tagged asset to those previously associated with the same tagged asset to determine changes in condition. Non-limiting examples of parameters taken into account when comparing historic and current images of an asset include changes in color, changes in shape, and/or changes in size, and/or other changes. Additionally, or alternatively, image intelligence is determined by comparing the image data to generic images of assets stored in the database and/or accessed through third-party sources (e.g., a third-party search engine). Additionally, or alternatively, image intelligence is determined by comparing the image data to images previously collected and/or identified by other previous and/or other current users of the system.

In a preferred embodiment, the application prompts for confirmation that information determined through image intelligence is correct (e.g., via user input). If the platform is unable to determine certain information through image intelligence or the information collected using image intelligence is incorrect (e.g., the user does not confirm), the platform is operable to prompt for correct information and use the correct information (e.g., input by the user) along with the associated video data to improve AI/ML performance.

The platform is preferably operable to create an image of the tagged asset based on all data the platform has without any image, video, and/or audio data. For example, and not limitation, based on text analysis, the platform is operable to identify the tagged asset and create an image of the tagged asset. In one embodiment, synthetic images created by a computer are operable to represent the tagged asset (e.g., similar to DALL-E).

In one embodiment, video intelligence collected from the video processing engine includes, but is not limited to, asset colors, asset sizes, asset shapes, number of different assets, text associated with a tagged asset (e.g., text on a box containing the tagged asset), date the video was taken and/or uploaded, time the video was taken and/or uploaded, asset identities, asset ages, asset conditions (e.g., clean or dirty, broken or not broken, etc.), and/or asset locations in relation to other objects in the video. Methods to obtain video intelligence include implementing the same and/or similar techniques of processing and machine vision as described previously in relation to image data to the video data on a frame-by-frame basis.

In a preferred embodiment, the application prompts for confirmation that information determined through video intelligence is correct (e.g., via user input). If the platform is unable to determine certain information through video intelligence or the information collected using video intelligence is incorrect, the platform is operable to prompt for the correct information and use the correct information (e.g., input by the user) along with the associated video data to improve AI/ML performance.

In one embodiment, the system is operable to analyze wear and tear of a tagged asset. For example, and not limitation, the system is operable to create a video by stitching together a plurality of images taken over a period of time (e.g., one picture a month for 2 years). The system is operable to provide a timelapse video of the tagged asset that represents the wear and tear.

In a preferred embodiment, the audio processing engine implements AI/ML/NLP techniques to analyze audio and collect audio intelligence. In one embodiment, the audio processing engine is operable to process and analyze audio in real-time or near real-time. In one embodiment, the audio data of the tagged asset is operable to be collected and analyzed to determine whether the tagged asset is malfunctioning or properly functioning. In such embodiments, the audio processing engine is further operable to perform diagnostics on the audio of a malfunctioning tagged asset to determine the issue causing the malfunction. In a non-limiting example, a tagged asset is malfunctioning due to a misfiring piston in a gasoline engine incorporated into the tagged asset. In such an example, audio data associated with the tagged asset is operable to be analyzed by the audio processing engine to conclude that the tagged asset is malfunctioning and that the cause of the malfunction is the misfiring piston. In such an example, the platform is operable to alert the owner of the tagged asset of the issue and facilitate purchase and delivery of a replacement piston to the location of the tagged asset and/or schedule a mechanic to arrive at the location of the tagged asset. Additional information about audio processing and anomaly detection/diagnostics is disclosed in (1) Chalapathy, R., & Chawla, S. (2019). *Deep learning for anomaly detection: A survey.* arXiv preprint arXiv: 1901.03407., (2) Chandola, V., Banerjee, A., & Kumar, V. (2009). *Anomaly detection: A survey.* ACM computing surveys (CSUR), 41 (3), 1-58., and (3) Henriquez, P., Alonso, J. B., Ferrer, M. A., & Travieso, C. M. (2013). *Review of automatic fault diagnosis systems using audio and vibration signals.* IEEE Transactions on Systems, Man, and Cybernetics: Systems, 44 (5), 642-652, each of which is incorporated herein by reference in its entirety.

In one embodiment, the audio processing engine is further operable to analyze the speech of a user and use such analysis to initiate responses, alerts, and/or actions in network-enabled devices. In such embodiments, the audio processing engine implements one or more NLP algorithms to analyze the audio data. In one embodiment, the one or more NLP algorithm includes precursor speech-to-text and speech-based voice recognition to ensure the proper input is relayed into the one or more NLP algorithms and that the audio input is the voice of the tagged asset owner or an authorized user assigned to the tagged asset. In a non-limiting example, the remote device gathers audio of a user who says "inspecting this device, I find it needs to have a widget, a controller, and a compressor replaced," after scanning a tag attached to the tagged asset. The one or more NLP algorithm is operable to analyze this input and understand the user's statement and store the information on the cloud platform associated with the tagged asset. The platform is further operable to use location data associated with the device to automatically order and send the parts requested by the user to the location of the tagged asset needing the parts. In one embodiment, the one or more NLP algorithm is further operable to generate a response based on the audio. In a non-limiting example, the remote device gathers audio of a user asking, "How many power drills do I own?" The remote device then is operable to send the request to the platform. The platform is then operable to analyze the audio to understand the user's request, determine how many power drills are associated with the user's account, formulate a response answering the user's request, and send the response to the remote device. In one embodiment, the remote device is operable to play the response answering the user's request. Alternatively, the remote device displays the answer on a GUI.

In one embodiment, analysis of audio produced by the tagged asset or speech analysis further includes analysis of changes in audio characteristics. Characteristics analyzed include, but are not limited to sound pressure, pitch, audio quality, tempo, etc. In such embodiments, characteristics are further analyzed over time as a means to detect anomalies and/or changes in function of the tagged asset. Once changes to the function of the tagged asset reach a threshold level, the platform is operable to issue an alert (e.g., to the remote device). In one embodiment, the alert includes information relating to probable issues with the tagged asset (e.g., based on changes in audio characteristics), at least one recommendation to address the probable issues, tools needed to execute one or more of the at least one recommendation, and instructions to execute the one or more of the at least one recommendation. In a non-limiting example, a tag is affixed to a child's toy that plays audio when activated. Audio data is collected at the toy by the tag, hub, disc, remote device, and/or network-enabled device. The platform associates the audio data with the tagged asset and analyzes the data. Over time, the audio data collected at the tagged asset when activated becomes lower in sound pressure, pitch, and/or tempo. Once changes reach a threshold level, the platform issues an alert (e.g., to the remote device) recommending the batteries of the toy be changed. The platform is further operable to present to the user the tools necessary to change the batteries and instruction to changing the batteries.

Data Analytics

The present invention further provides data analytics and insightful information regarding the at least one tagged asset. Data related to the at least one tagged asset (e.g., data gathered through image intelligence, video intelligence, and/or audio intelligence) collected by the at least one remote device, the at least one tag, the at least one disc, and/or the at least one hub is collected and provided to the analytics engine. The data related to the at least one tagged asset is further analyzed and operable to be presented, for example, via notifications, alerts, and/or reports (e.g., to the remote device). Examples include, but are not limited to, historical condition data, historical numerical data (e.g., how many assets with an asset class has tagged over time), use analysis, value analysis, etc.

Leveraging data from many tagged assets creates unique intelligence. The system is operable to leverage the Bayesian inference engine as previously described.

Advantageously, in a preferred embodiment, this system is a closed system. Data is only communicated within the platform between authorized components (e.g., tags, sensors, devices) and/or authorized individuals. Thus, only individuals who are expressly given permission to communicate with a tag are operable to communicate with the tag. In one embodiment, authorized individuals are only able to receive data from the tag when communicating with the tag. For example, in one embodiment, a tag only provides location data when scanned (e.g., NFC, RFID) and data is not automatically transmitted to the platform.

Architecture

Figure 8:
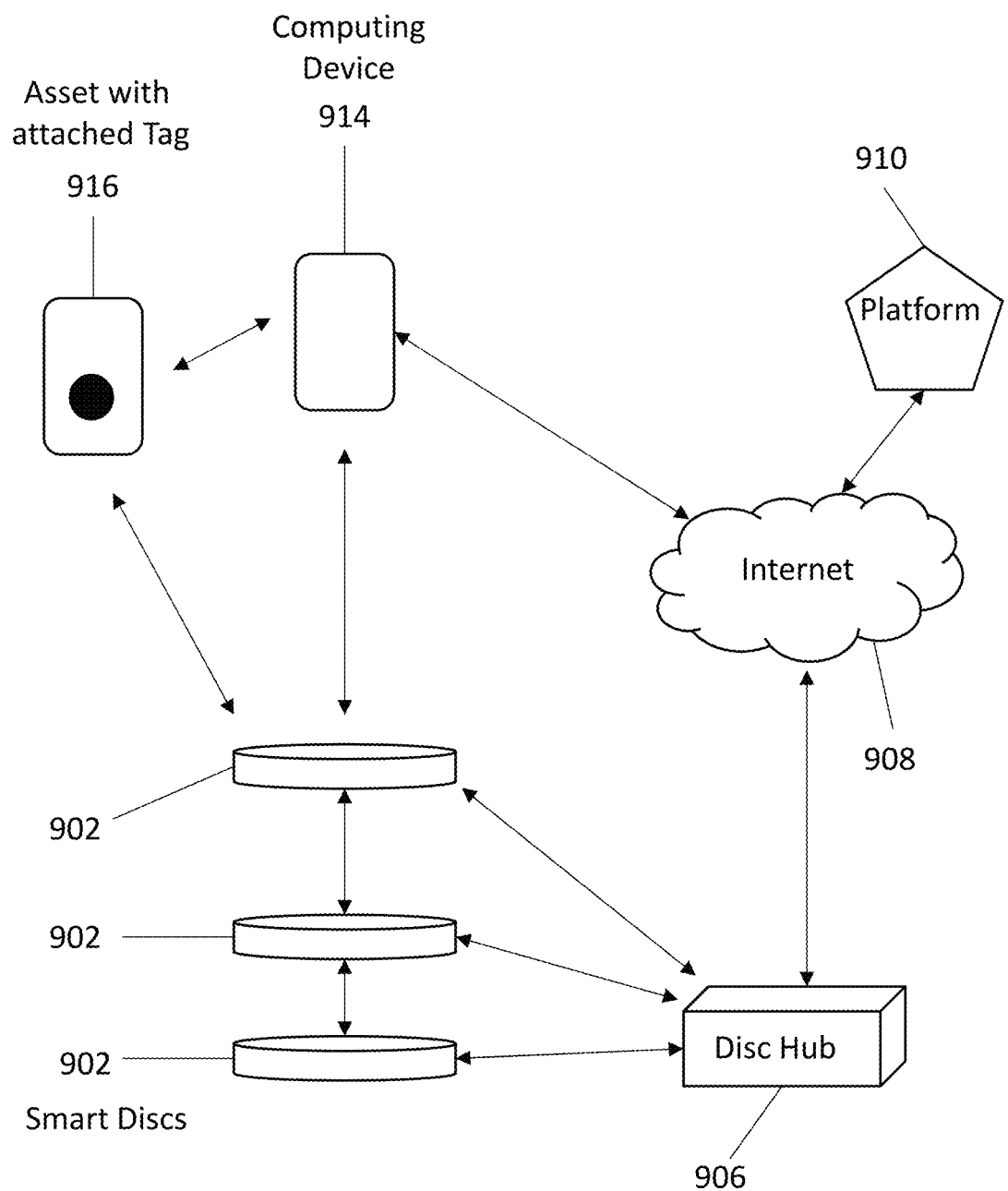
FIG. 8 illustrates one embodiment of a platform architecture of the present invention.

FIG. 8 illustrates one embodiment of a platform architecture of the present invention. At least one computing device 914 is operable to read at least one tag connected to at least one asset 916 and write to the at least one tag connected to at least one asset 916, wherein the at least one tag connected to at least one asset 916 is operable for data storage. The at least one computing device 914 includes, but is not limited to, a device operable to capture audio, video, and/or images of a tagged asset. In addition, the at least one computing device 914 is operable for network communication with at least one smart disc 902 and at least one platform 910. The at least one platform 910 provides the authentication, management, and data analysis of the assets using tags and other capture data. Each of the at least one smart disc 902 is operable to read the at least one tag connected to at least one asset 916 and write data to the at least one tag connected to at least one asset 916, wherein the at least one tag connected to at least one asset 916 is operable for data storage. Each of the at least one smart disc 902 is further operable to weigh, measure, capture images, capture video, and/or record audio of at least one asset. Each of the at least one smart disc 902 is operable for network communication with other smart discs 902 as well as with a mesh network. Each of the at least one smart disc 902 is further operable for network communication with the at least one platform 910 through the computing device 914 and/or through a disc hub 906. Alternatively, each of the at least one smart disc is operable for direct network communication the at least one platform. In one embodiment, the disc hub 906 enables network communication between at least two smart discs 902, wherein the disc hub 906 is in network communication with the Internet 908. Alternatively, each of the at least one smart disc is operable for direct network communication with at least one other smart disc. In one embodiment, the disc hub 906 enables wireless network communication between smart discs 902 including, but not limited to, BLUETOOTH, NFC, and/or WI-FI, wherein the smart discs 902 are further operable for network communication with the at least one platform 910.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 9:
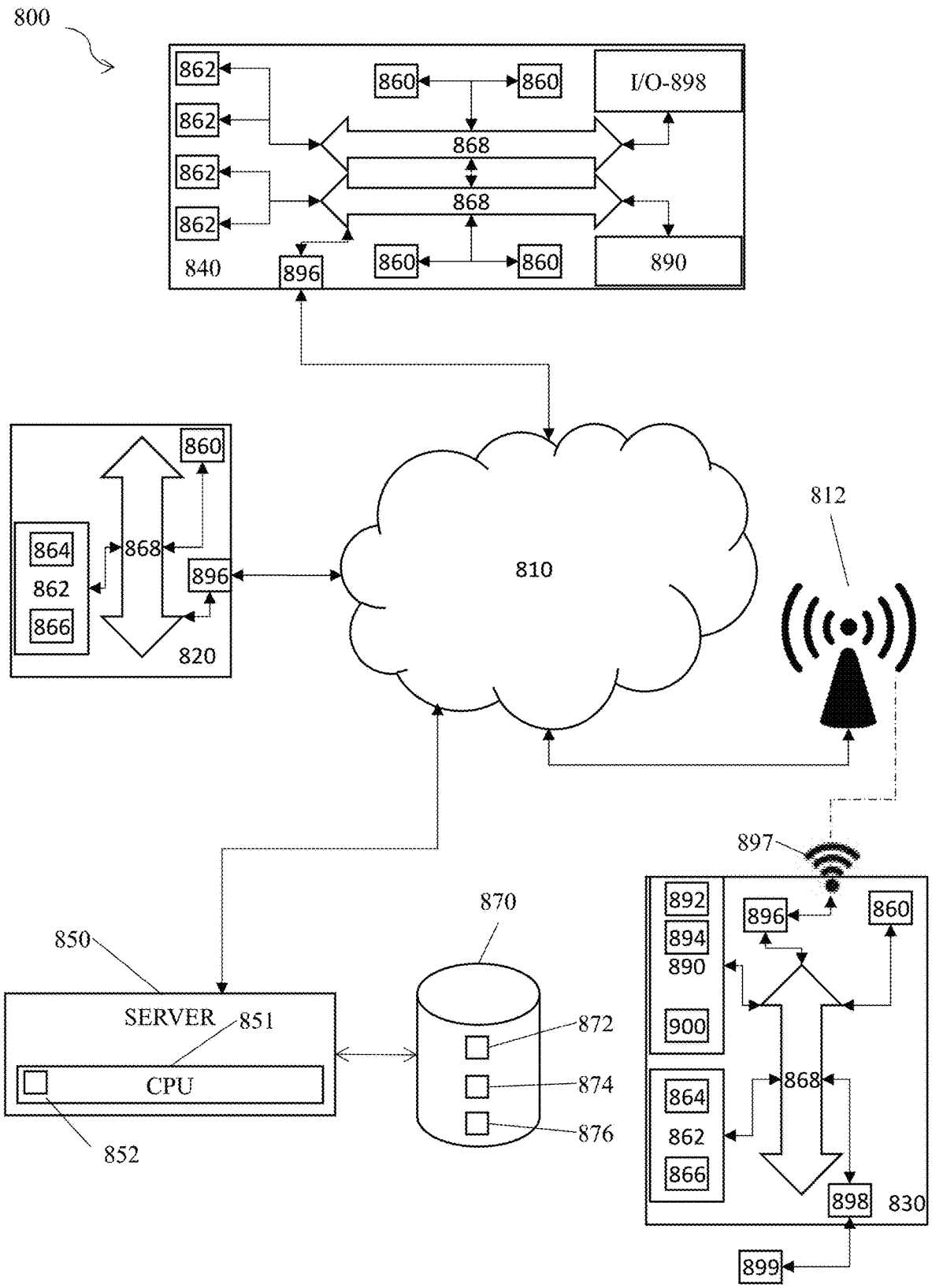
FIG. 9 illustrates a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 1000. Non-transitory computer readable media includes all computer readable media, with the sole exception being a transitory, propagating signal per se. The instructions 1000 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for asset management comprising:
at least one tag attached to at least one asset;
an asset management platform including a server with a processor and a memory;
wherein the asset management platform includes a database;
wherein the at least one tag is associated with asset data related to the at least one asset;
wherein the database includes at least one media file associated with the at least one asset;
wherein the at least one media file includes at least one image file of the at least one asset, at least one video file of the at least one asset, and/or at least one audio file associated with the at least one asset;
wherein the asset data and the at least one media file is configured to be displayed on a display of a remote device or played by the remote device upon the remote device reading the at least one tag; and
wherein the asset management platform includes an image and/or video processing engine, wherein the image and/or video processing engine is configured to analyze the at least one image file of the at least one asset and/or the at least one video file of the at least one asset, wherein the analysis of the at least one image file of the at least one asset and/or the at least one video file of the at least one asset provides a color of the at least one asset, a size of the at least one asset, a shape of the at least one asset, a number of the at least one asset, text associated with the at least one asset, a condition of the at least one asset, an age of the at least one asset, and/or a location of the at least one asset relative to other objects.

2. The system of claim 1, wherein the at least one image file of the at least one asset, the at least one video file of the at least one asset, and/or the at least one audio file associated with the at least one asset includes an image file of the at least one asset, a video file of the at least one asset, and/or an audio file associated with the at least one asset uploaded by a user device and associated with the at least one asset.

3. The system of claim 2, wherein the at least one image file of the at least one asset, the at least one video file of the at least one asset, and/or the at least one audio file associated with the at least one asset further includes an image file of the at least one asset, a video file of the at least one asset, and/or an audio file associated with the at least one asset extracted from a website based on content of the image file of the at least one asset, the video file of the at least one asset, and/or the audio file associated with the at least one asset uploaded by the user device and associated with the at least one asset and/or a location associated with the image file of the at least one asset, the video file of the at least one asset, and/or the audio file associated with the at least one asset uploaded by the user device and associated with the at least one asset.

4. The system of claim 1, wherein the at least one asset is registered with a first social media account, and wherein the at least one asset is configured to be sold or loaned to a second social media account by the first social media account.

5. The system of claim 1, wherein the asset management platform is configured to send an alert to a user device based on the content of the at least one file.

6. The system of claim 1, wherein the at least one media file includes a first media file and a second media file, wherein the asset management platform is configured to compare the first media file to the second media file, and wherein the asset management platform is configured to send an alert to a user device based on the comparison of the first media file to the second media file.

7. The system of claim 1, wherein the asset management platform is configured to send an alert based on the analysis of the at least one image file of the at least one asset and/or the at least one video file of the at least one asset.

8. The system of claim 1, wherein the asset management platform includes an audio processing engine, wherein the audio processing engine is configured to analyze the at least one audio file associated with the at least one asset to diagnose a malfunction with the at least one tagged asset or detect an anomaly associated with the at least one tagged asset.

9. The system of claim 1, wherein the at least one audio file associated with the at least one audio file associated with the at least one asset includes audio related to a part or an object for the at least one asset and wherein the asset management platform is configured to order the part or the object for the at least one asset through a website or application.

10. The system of claim 1, wherein the asset management platform is configured to receive an audio request, analyze the audio request using natural language processing (NLP) based on the at least one media file associated with the at least one asset or other information stored in the database, and send a response to the audio request to the remote device.

11. The system of claim 1, wherein the database includes historical condition data, use analysis data, or value analysis data for the at least one asset.

12. The system of claim 1, wherein the asset management platform is configured to analyze the at least one media file and provide instructions related to the at least one asset to the remote device upon analyzing the at least one media file.

13. A system for asset management comprising:
at least one tag attached to at least one asset;
an asset management platform including a server with a processor and a memory;
wherein the asset management platform includes a media processing engine;
wherein the at least one tag is associated with asset data related to the at least one asset;
wherein the asset management platform is configured to receive at least one media file associated with the at least one asset;
wherein the media processing engine is configured to analyze image, video, and/or audio components of the at least one media file;
wherein the media processing engine is configured to recommend an action based on the analysis of the image, video, and/or audio components of the at least one media file; and
wherein the action includes a maintenance action or a repair action for the at least one asset.

14. The system of claim 13, wherein the action includes purchasing an object through a website or an application, wherein the asset management platform is further configured to purchase the object through the website or the application.

15. The system of claim 13, wherein the asset management platform is configured to compare data generated from the analysis of the image, video, and/or audio components to historical condition data, use analysis data, or value analysis data for the at least one asset.

16. A system for asset management comprising:
at least one tag attached to at least one asset;
an asset management platform including a server with a processor and a memory;
wherein the asset management platform includes a database and an audio processing engine;
wherein the at least one tag is associated with asset data related to the at least one asset;
wherein the database includes data associated with the at least one asset;
wherein upon the remote device reading the at least one tag, the remote device is operable to access the information in the database associated with the at least one asset;
wherein after reading the at least one tag and accessing the information in the database associated with the at least one asset, the audio processing engine is configured to receive audio from the remote device, wherein the audio includes a request for information for the at least one asset;
wherein the audio processing engine is configured to analyze request for information and generate a response to the request for information for the at least one asset based on the information in the database associated with the at least one asset; and
wherein the asset management platform is configured to send the response to the request for information to the remote device and the remote device is configured to display the response or play the response via a speaker.

17. The system of claim 16, wherein the response includes a hyperlink to a website including information relating to the at least one asset including information relating to maintenance, repair, or replacement of the at least one asset and/or accessories for the at least one asset.

18. The system of claim 16, wherein the asset management platform is configured to analyze the request for information using natural language processing (NLP), machine learning (ML), and/or artificial intelligence (AI).

* * * * *